Patented Apr. 28, 1925.

1,535,093

UNITED STATES PATENT OFFICE.

RAYMOND C. BENNER, OF FREMONT, OHIO, ASSIGNOR TO NATIONAL CARBON COMPANY, INC., A CORPORATION OF NEW YORK.

PROTECTED BOBBIN AND METHOD OF MAKING THE SAME.

No Drawing.      Application filed March 5, 1921. Serial No. 450,073.

*To all whom it may concern:*

Be it known that I, RAYMOND C. BENNER, a citizen of the United States, residing at Fremont, in the county of Sandusky and State of Ohio, have invented certain new and useful Improvements in Protected Bobbins and Methods of Making the Same, of which the following is a specification.

This invention relates to improvements in dry cell bobbins or cores and has particular reference to forming a tough adherent coating upon the bobbin surface.

Bobbins are usually made by molding a mix of carbonaceous and depolarizing material, moistened with electrolyte solution, about a carbon rod. It is customary to protect the bobbins by wrapping them in cheese cloth or similar fabric, which must be suitably tied in position.

By proceeding according to my invention, as fully described hereinafter, the expensive and tedious operations of wrapping and tying may be dispensed with and positive advantages over the wrapped structure obtained. The methods of my invention consist in general of supplying a tenacious and resistant coating or integument of material which may be applied as a liquid and which readily sets upon the bobbin surface. Bobbins so protected may be handled without danger of causing partial disintegration and do not tend to scale or crumble when subjected to the softening action of the electrolyte and other cell conditions.

In a preferred mode of applying the protective coating, cereal paste is projected upon the bobbin surface by showering or spraying. Mechanical devices for applying liquids uniformly in finely divided condition are well known and any desired type may be used in distributing the paste. An advantageous method is to arrange spray jets in such positions as to throw an enveloping shower of paste upon the bobbins, which may be mechanically advanced between the jets.

Any paste which is readily toughened by dehydration, coagulation or the like is adapted to the procedure described above, but I have found that superior results are obtained by using a raw flour paste made up of about 25% by weight of wheat flour and 75% by weight of water. Any desired proportions of paste-forming cereal may of course be used, provided only that on the one hand the paste is sufficiently fluid to be sprayed and on the other sufficiently viscous to adhere properly to the bobbin. Electrolyte solution instead of water may be used in making up the paste or electrolyte salts may be dissolved in it before spraying. In fact incorporation of electrolyte salts in about the proportions described below is desirable to facilitate the setting of the paste.

The coated bobbins should be allowed to stand for a short time for the paste to set; a few minutes is generally sufficient. The cell may then be completed in the way usually followed when fabric-wrapped bobbins are used. The setting may be accelerated, if desired, by passing the coated bobbins through a zone of heat. Air drying at ordinary temperatures, however, is satisfactory.

Spraying presents considerable advantages over other methods of applying the paste, as for example dipping or brushing. The sprayed coating is uniform and continuous and its thickness may be readily regulated by varying the viscosity of the paste. It is not in general necessary to make any special provision for permitting the sprayed bobbins to drain, as the paste particles impinging upon the surfaces build up the coating without substantial excess material. The paste not only forms a protective layer retaining the surface particles of the mix in position, but also binds them together by reason of its adhesive powers. This combined action gives ample support to the bobbin.

The spraying process may of course be applied to bobbins for cells of any size. It is also in the main immaterial what the constitution of the mix is, so far as the application of the coating is concerned. Carbon and manganese dioxide passing a hundred mesh screen are of suitable fineness for making up the mix to be molded and coated.

Bobbins coated by spraying with a paste as above described, by dipping, or otherwise, may be further treated according to my invention to provide a still tougher and stronger protective layer. I effect this by dipping the coated bobbin into hot oil, fat or other liquid in which the paste is insoluble.

In this method any desired paste may be used, but I have found the following to be satisfactory: 100 parts water, 18 parts zinc chlorid, 33 parts ammonium chlorid, 31 parts wheat flour, 15.6 parts potato starch, and .42 parts mercuric chlorid. The bobbins may be coated with this paste, drained if necessary, dipped into oil at a temperature of 110° to 150° C. and allowed to cook from 30 seconds to 3 minutes. Particular conditions may cause variation from these figures, but it can easily be determined by observation what temperature and time of immersion give a suitable toughened coating. After the treatment with the hot oil the bobbins are allowed to cool and are then ready for use.

Paste cooked in this way forms a very tough, durable coating, which adequately protects the surface of the bobbin. There is substantially no loss of moisture from the mix during the cooking, as the hot oil forms a toughened outer layer of paste as soon as the bobbin is immersed and the heat does not penetrate into the interior of the bobbin. It has been found that the amount of oil retained by the paste coating is so small as not to hinder the functioning of the cell.

The essential action of the hot oil is a dehydration and it is therefore possible to use any oil or other liquid material, mineral, animal or vegetable, which may be heated to the requisite temperature without substantial decomposition and which does not dissolve the paste. For example, lard, cottonseed oil or paraffin may be used.

Aside from the protective properties of the paste coating, it is advantageous in that it is of the same general nature as the excitant mixture and therefore introduces no inert substance to occupy cell space which should be devoted to active material. In use the paste, through its own electrolyte content or by taking up electrolyte from the adjacent excitant, quickly furnishes a low resistance path for the current.

I have described my invention with particular reference to starchy coatings, as these furnish the most economical and efficient protective means. However, any gelatinizable or pasty material which will readily toughen or harden on exposure to the atmosphere or heat is within the scope of my invention, such as glues, colloidal silicic acid, or the like. Water or electrolyte solution is the preferred vehicle, but other carriers or solvents may be used.

I claim:

1. In a process of making a protected bobbin, spraying a coating-forming material upon the bobbin surface.

2. In a process of making a protected bobbin, spraying a cereal paste upon the bobbin surface.

3. The process of making a protected bobbin comprising spraying a coating-forming material upon the bobbin surface and toughening the material.

4. The process of making a protected bobbin comprising applying a coating-forming material to the bobbin surface and subjecting the material to heat.

5. The process of making a protected bobbin comprising applying a coating-forming material to the bobbin surface and subjecting the material to heat from a fluid substance.

6. The process of making a protected bobbin comprising applying a coating-forming material to the bobbin surface and subjecting the material to heat from an oily substance.

7. The process of making a protected bobbin comprising applying a coating-forming material to the bobbin surface and subjecting the material to heat from an oily substance at 110° C. to 150° C.

8. The process of making a protected bobbin comprising applying a coating-forming material to the bobbin surface and subjecting the material to heat from an oily substance at 110° C. to 150° C. for a time sufficient to permit the paste to cook.

9. The process of making a protected bobbin which comprises spraying a cereal paste upon the bobbin surface and cooking the paste in hot oil.

10. A dry cell bobbin having an adherent coating comprising a heat toughened coating-forming material.

11. A dry cell bobbin having a coating of heat toughened cereal paste.

12. A dry cell bobbin having a coating of cooked starchy material.

In testimony whereof, I affix my signature.

RAYMOND C. BENNER.